United States Patent [19]

Mandella

[11] Patent Number: 5,211,065
[45] Date of Patent: May 18, 1993

[54] APPARATUS FOR TRANSLATING ROTATIONAL MOTION TO HARMONIC LINEAR MOTION

[76] Inventor: Michael Mandella, 998 Bidwell Ave., Sunnyvale, Calif. 94086

[21] Appl. No.: 762,498

[22] Filed: Sep. 19, 1991

[51] Int. Cl.⁵ .............................................. F16H 21/34
[52] U.S. Cl. ............................................. 74/51; 74/39; 74/44; 123/56 AC; 123/197.4
[58] Field of Search ............................... 74/39, 44, 51; 123/56 AC, 56 BC, 197.4

[56] References Cited

U.S. PATENT DOCUMENTS

| | | | |
|---|---|---|---|
| 1,094,398 | 4/1914 | Anderson | 123/56 BC |
| 1,162,119 | 11/1915 | Williams | 74/44 |
| 3,421,379 | 1/1969 | Carroll | 74/44 |

FOREIGN PATENT DOCUMENTS 5129 of 1901 United Kingdom .................... 74/44

*Primary Examiner*—Allan D. Herrmann
*Attorney, Agent, or Firm*—Fliesler, Dubb, Meyer & Lovejoy

[57] ABSTRACT

An improved connecting rod assembly for a reciprocating internal combustion engine provides essentially simple harmonic linear motion of a piston, thereby eliminating forces and moments caused by non-simple harmonic linear motion of a piston. The connecting rod assembly of the present invention maintains a uniform distance between a crank pin and a piston. Essentially simple harmonic piston motion also increases engine efficiency by reducing the amount of negative work which results from detonation before top dead center. The connecting rod assembly may include a first member rotatably connected to a crankshaft and having two connection points each spaced a distance A/2 from the crankshaft connection, and second and third members having a length C, arranged in a crossing relationship, and connecting respective ones of the connection points of the first member to respective ones of two connection points on a piston, the piston connection points being spaced apart by a distance B. In one embodiment, the ratios A:B:C are 2:4:5.

32 Claims, 7 Drawing Sheets

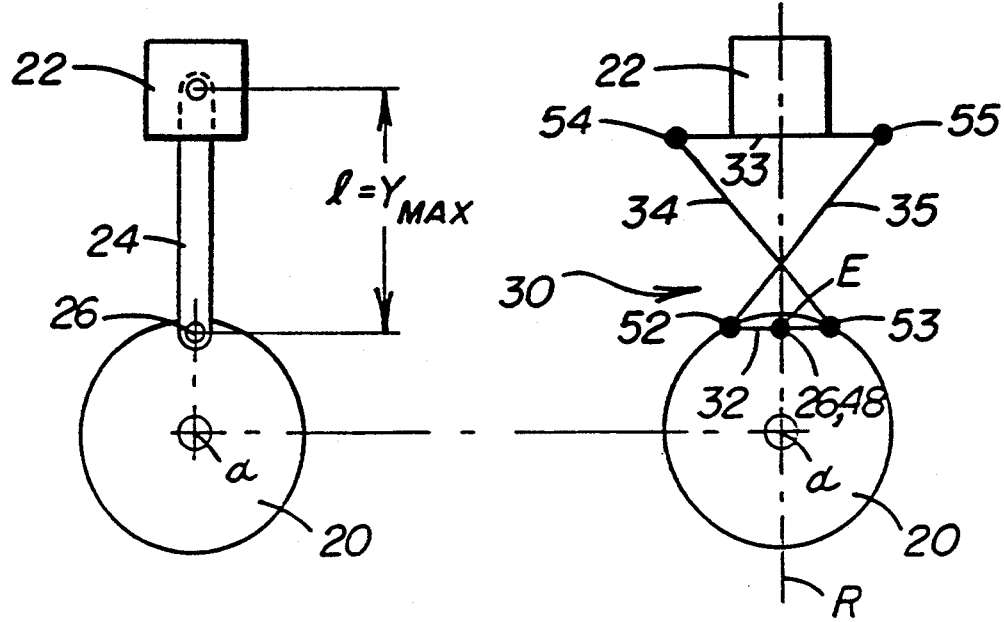
FIGURE 1A
(PRIOR ART)
FIGURE 2A
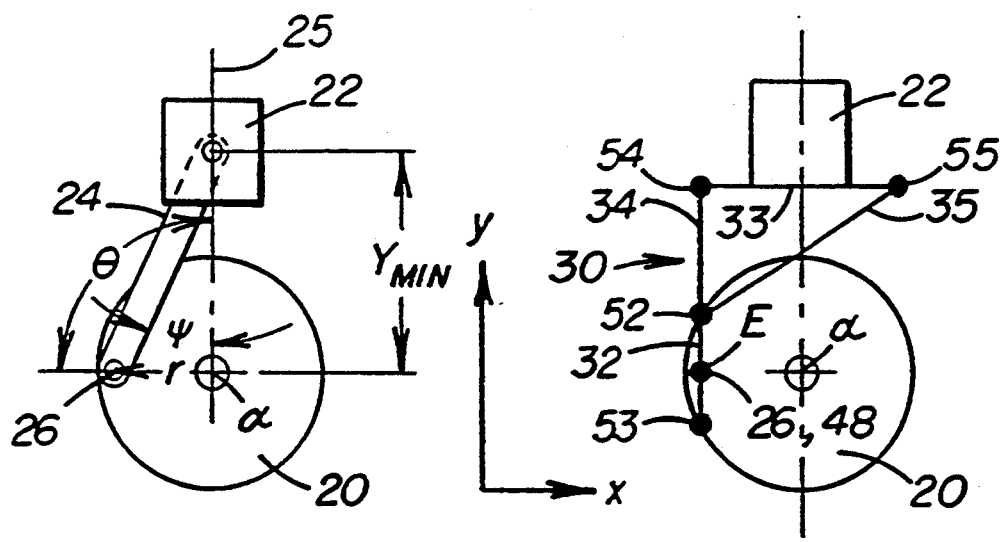
FIGURE 1B
(PRIOR ART)
FIGURE 2B

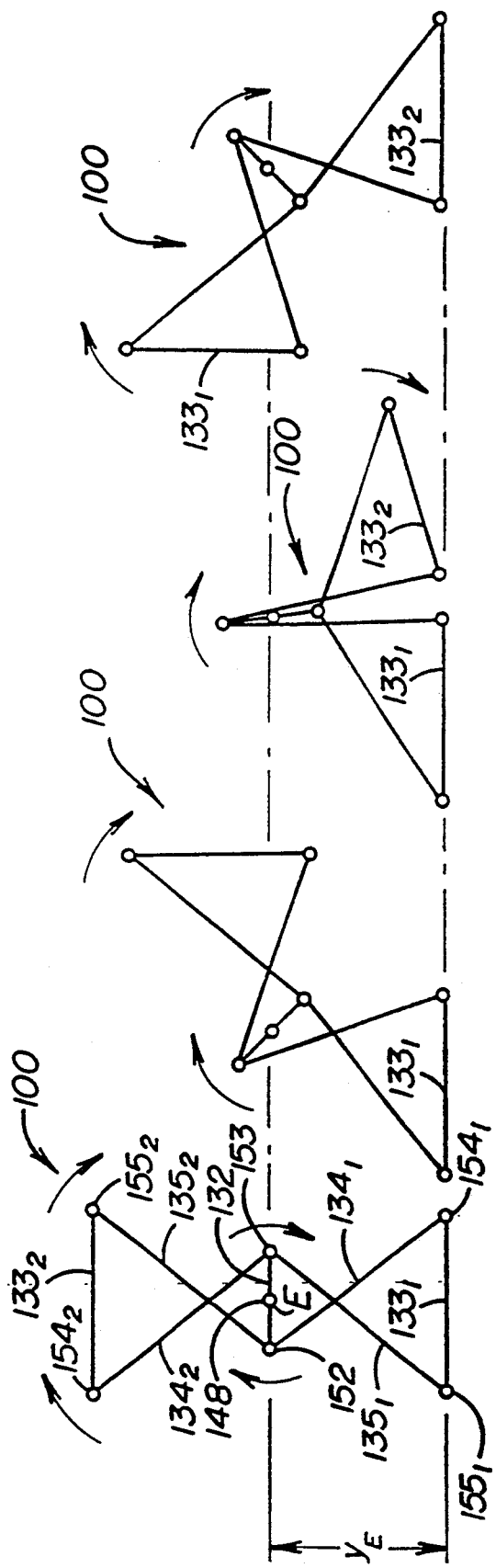

APPARATUS FOR TRANSLATING ROTATIONAL MOTION TO HARMONIC LINEAR MOTION

BACKGROUND OF THE INVENTION

1. Field of the Invention

The present invention relates to assemblies for translating rotational motion to reciprocal harmonic linear motion; in particular, connecting rod assemblies for internal combustion engines. The present invention also relates to assembly for translating two planar objects with respect to each other while maintaining a constant distance between the two planar objects, and an assembly for walking while maintaining a support position at a uniform distance above the surface being walked upon.

2. Description of the Related Art

Conventional reciprocating internal-combustion engines include a block having cylinders, a rotating crankshaft, and one or more pistons, which move in linear, reciprocating motion in the cylinders, connected to the crankshaft by connecting rods. The structure and operation of conventional internal-combustion engines is well known, and has been described in, for example, *The Internal-Combustion Engine in Theory and Practice*, Charles Fayette Taylor, the M.I.T. Press, copyright 1968 and 1985.

The crankshaft is mounted to the block so that the crankshaft rotates about a crankshaft-rotation axis. Each cylinder in the block has an axis which passes through the crankshaft-rotation axis. The crankshaft has one or more crank pins having a crank pin axis which is substantially parallel to and spaced a distance r from the crankshaft-rotation axis; thus, r defines the radius of the circle circumscribed by the crank pin. The angular position of the crank pin is measured by the angle $\theta$ from top dead center (tdc), and the angular velocity $d\theta/dt$ of the crank pin is expressed as $\omega$. The length of the connecting rod is $l$.

The mass m which is considered to reciprocate with the piston includes the piston, the piston rings, the piston pin (which attaches the piston to the rod) and the equivalent mass of the upper end of the connecting rod.

A conventional connecting rod has a finite length $l$ which causes harmonic accelerations of the reciprocating mass (i.e., the piston), resulting in primary, secondary, and higher order harmonic unbalanced forces along the piston axis. The forces are given by equation (1):

$$F = m\omega^2 r[\cos\theta + (r/l)a_2\cos 2\theta + (r/l)a_4\cos 4\theta + \text{higher order terms}] \quad (1)$$

Equation (1) describes a primary unbalanced force varying in amplitude with crankshaft rotation and a secondary unbalanced force varying at twice the crankshaft speed and higher order forces varying at higher even multiples of crankshaft speed. The coefficient $a_2$ in the secondary force component of equation (1) is $\simeq 1$, and the frequency of the secondary force is twice the frequency of the primary force.

Because of space considerations, a typical modern engine has an r/l ratio ranging from about 0.2 to about 0.33, resulting in secondary inertial forces having an amplitude of 1/5 to ⅓ of the amplitude of the primary inertial forces. As the ratio r/l approaches zero, the secondary and higher order inertial forces disappear and the piston motion approaches that of simple harmonic motion. Accordingly, one approach to remove the higher order forces is to increase $l$ so that r/l approaches zero. However, the space considerations make this solution impractical.

FIGS. 1A and 1B schematically illustrate the $\theta = 0°$ and the $\theta = 90°$ orientations of a conventional engine including a crankshaft 20, a piston 22, and a connecting rod 24. In essence, the y-separation distance between the crank pin 26 and the piston 22 is not fixed; the variation in this distance depends on factors including the length $l$ of the connecting rod, and the angle $\psi$ between connecting rod 24 and the cylinder axis 25, where the cylinder axis 25 is defined as the axis of connecting rod 24 when $\theta = 0$. As the crank pin 26 moves in a circular path of radius r, the Y-separation distance between the crank pin 26 and the piston 22 varies between a maximum value $Y_{MAX}$ equal to $l$ at $\theta = 0°$ and $\theta = 180°$ a minimum value $Y_{MIN}$ equal to $\sqrt{l^2 - r^2}$ at $\theta = 90°$. The difference between these two extreme values divided by the full piston stroke 2r corresponds to the percent maximum variation %$\Delta Y$ of the Y-separation distance with respect to the total travel distance of the piston and is given in equation (2):

$$\%\Delta Y = \frac{1 - \sqrt{1 - (r/l)^2}}{2(r/l)} \times 100 \quad (2)$$

When the value %$\Delta Y$ is zero, the Y-separation distance is constant (corresponding to case of an infinitely long connecting-rod 24) and the piston 22 moves in simple harmonic linear motion in response to the uniform rotation of the crankshaft 20.

*For r/l=0.2 %$\Delta Y$=5.05 and for r/l=0.33 %$\Delta Y$=8.48.*

In engine design, one of the main constraints influencing the number and placement of (i.e., configuration) of the cylinders in a multi-cylinder engine is satisfactory balancing of the axial forces produced by the reciprocating mass in each cylinder. When many cylinders are adjacent to each other, the primary forces, and sometimes also the secondary forces, can be made to cancel each other when certain fixed phase relationships and spatial relationships between the reciprocating masses exist. Unbalanced moments associated with these forces result when the axes of any two adjacent cylinders do not lie along the same line and thus the forces do not have the same line of action. The primary and secondary moments can also be eliminated in some cases by adding additional pairs of cylinders. For example, the conventional in-line, 4-cylinder, 4-cycle engine utilizes a symmetrical crankshaft, such as the crankshaft shown in FIG. 3, which results in cancellation of the primary forces and the primary and secondary moments, but not the secondary forces which reinforce each other producing a large resultant second-order shaking force in the engine.

An engine is balanced by eliminating as many forces and moments as possible, and by the proper combination of crankshaft design, number of cylinders and cylinder arrangement. Common cylinder arrangements or configurations include in-line engines, horizontally-opposed engines, "V", "X", "W", and "H" type engines, and radial engines. Whatever the arrangement, it is unusual to have more than six or eight cylinders in a row because of torsional vibrations in the crankshaft which even for short crankshafts can become severe at certain critical engine speeds. Primary, secondary, and higher harmonic torsional vibrations occur as a result of the inertia of the reciprocating mass doing work on the crankshaft. The inertia torque applied to the crankshaft is given by equation (3).

$$T = m\omega^2 r^2 [t_1 \sin\theta + t_2 \sin 2\theta + t_3 \sin 3\theta + \text{higher order terms}] \quad (3)$$

The inertia torque coefficients $t_n$ are zero only when $r/l=0$, except the second order coefficient $t_2$ which is the only torque present in the case of simple harmonic motion. To date, balancing of the primary and secondary forces and moments has been accomplished in the following engine designs: in-line engines with 6 or 8 cylinders or more; horizontally-opposed engines with 8 or 12 cylinders or more; "V" type engines with 12 or 16 cylinders or more; "V" type engines with 8 cylinders (with counter-weighted crank); radial engines (with two counter-rotating counter-weights); and "W" type engines with 16 cylinders or more.

In normal operation of an internal combustion engine, as a spark is discharged to initiate the beginning of the combustion of the air-fuel mixture, the piston approaches the end of the compression stroke. Since combustion takes a finite time, the mixture is ignited during the compression stroke before the piston reaches top dead center (btdc). This results in a pressure rise associated with combustion before the end of the compression stroke, and an increase in the compression (negative) work. Advancing the timing allows the pressure rise associated with combustion to reach its peak at an optimum crank angle of $\theta = 5°-20°$ after top dead center (atdc) and thus causes the expansion (positive) work to increase. However, advancing the timing also increases the pressure during the compression stroke which in turn causes the compression (negative) work to increase. A trade-off between the btdc timing of the apark and the atdc timing of maximum pressure leads to an optimum ignition timing.

SUMMARY OF THE INVENTION

It is, therefore, an object of the present invention to provide a connecting rod assembly for an engine which eliminates forces and moments caused by the reciprocal motion of a piston.

A further object of the present invention is to provide a connecting rod assembly which allows a piston to move in essentially simple harmonic linear motion.

Another object of the present invention is to provide a connecting rod assembly which reduces the amount of negative work performed by an engine.

Another object of the present invention is to provide a four-cylinder internal combustion engine having balanced primary and secondary forces and moments.

Another object of the present invention is to provide a device for supporting a first object with respect to a second object so that the second object moves along the x axis of an x-y coordinate system at an essentially fixed y distance from said first object.

These and other objects of the present invention are provided by a connecting apparatus including three or four rigid members, each member having two pivot points. A first member has a center connection point rotatably connected to a first rotating object and a spacing of A units between the pivot points. A second member is connected to a second object which moves in reciprocal, linear motion and has a spacing of B units between the pivot points. The third and fourth members connect the first and second members and are arranged in a crossing relationship; the distance between the pivot points of the third and fourth members is C units.

In one embodiment $A<B<C$, and in another embodiment $B<A<C$. Specifically, for $A<B<C$, the ratio A:B ranges from 1.5:4 (0.375) to 3.5:4 (0.875) and the ratio B:C ranges from 4:4.5 (0.888) to 4:5.5 (0.727), and for $B<A<C$ the ratio A:B ranges from 4:1.5 (2.666) to 4:3.5 (1.142) and A:C ranges from 4:4.5 (0.888) to 4:5.5 (0.727). Three specific ratios A:B:C are contemplated: 2:4:5; 1.975:4:5.15; and 3:4:5. Interchanging the values of A and B provides three ratios for the $B<A$ embodiment.

For the case of $A<B<C$, the second member may be eliminated by attaching the third and fourth members directly to attachment positions on the second object.

For orientations of the connecting apparatus which maintain the crossing relationship of the third and fourth members and ratios A:B:C of 2:4:5, the perpendicular separation distance between the center point of the first member and the axis passing through the two pivot points of the second member is substantially constant, i.e., this distance varies by less than 0.3%.

The ratio 1.975:4:5.15 provides a variation of the perpendicular separation distance between the center point of the first member and the axis passing through the two pivot points of the second member of less than 0.05% for movements near the center position of the device.

An apparatus in accordance with the present invention for translating rotational motion to reciprocal linear motion, comprises first means for moving in rotational motion about a rotational axis, second means for moving in reciprocal linear motion along a reciprocal axis, and third means for connecting said first means and said second means so that said second means moves in essentially simple harmonic linear motion in response to uniform rotational motion of said first means.

BRIEF DESCRIPTION OF THE DRAWINGS

FIGS. 1A and 1B are schematic diagrams of a conventional crankshaft, piston, and connecting rod;

FIGS. 2A and 2B, are schematic diagrams of a crankshaft, piston, and connecting rod assembly in accordance with the present invention;

FIGS. 8A-8D are schematic diagrams showing various positions of a walking assembly in accordance with the present invention;

FIGS. 9A and 9B are side views of a translating device in accordance with the present invention;

DESCRIPTION OF THE PREFERRED EMBODIMENTS

The various embodiments of the present invention will be described with reference to FIGS. 1 through 12. In particular, various connecting rod assemblies in accordance with the present invention will be described in relation to 1, 2, and 4-cylinder reciprocating internal-combustion engines. It is to be understood, however, that connecting rod assemblies in accordance with present invention may be adapted for use with reciprocating internal-combustion engines having varying numbers of cylinders; for example, connecting rod assemblies in accordance with the present invention may be utilized with in-line five-cylinder and six-cylinder V-6, V-8, V-10 and V-12 engines which are currently in use. The present invention will also be described with reference to a walking device which is useful for vehicles operating in rough terrain, and a translation device which is useful for translating objects with respect to each other while maintaining a fixed distance between the objects.

Figure 3:
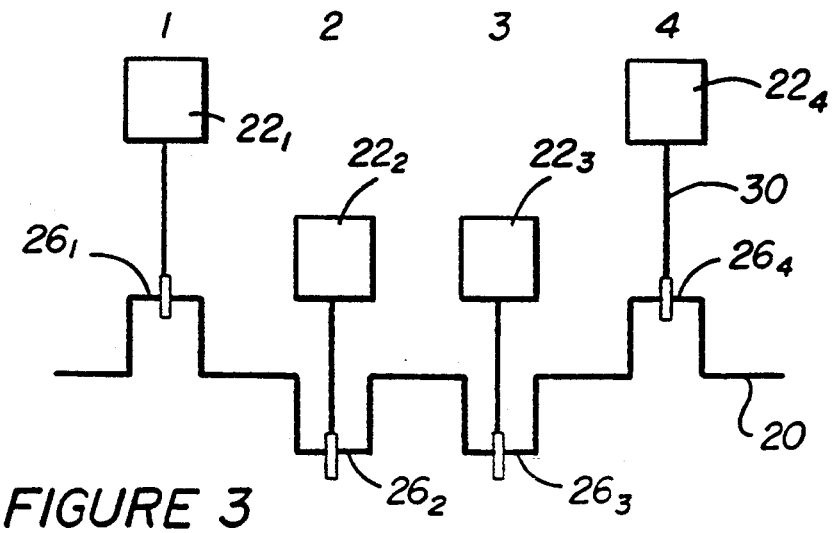
FIGS. 3 is a schematic side view of a four-cylinder in-line engine.
Figures 4A, 4B, 4C:
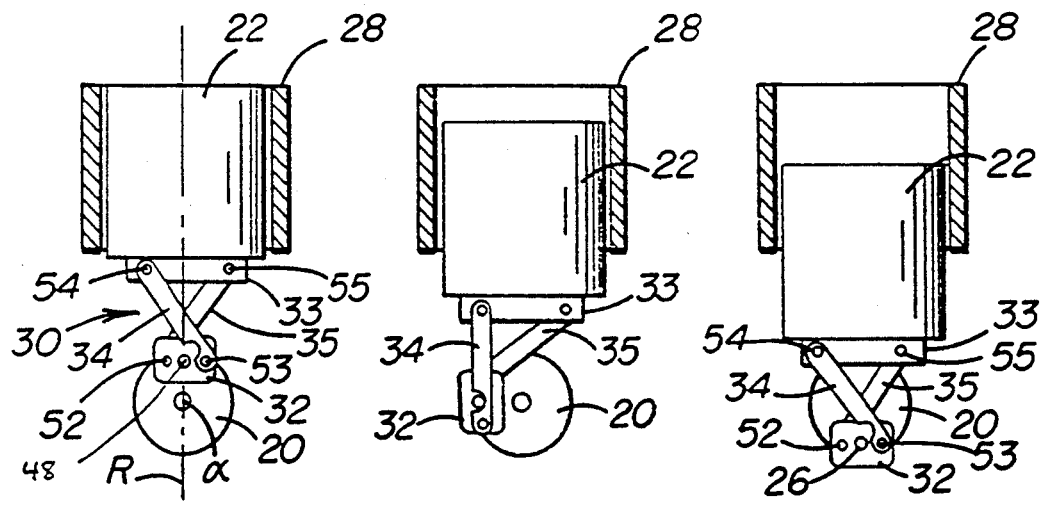
FIGS. 4A-4C show various positions of a crankshaft, piston, connecting rod assembly in accordance with an embodiment of the present invention.

A connecting rod assembly 30 in accordance with the present invention for connecting a crankshaft 20 and a piston 22 is shown in FIGS. 2 and 4. Piston 22 is adapted for reciprocal linear motion in a cylinder 28 which is part of an engine block. The reciprocal linear motion of piston 22 is along a reciprocal axis R which, in the preferred embodiment, intersects the rotational axis a of crankshaft 20. Assembly 30 is useful in, for example, a 4-cylinder, 4-cycle engine which is schematically represented in FIG. 3. This engine has a crankshaft 20 having four crank pins 26$_{1-4}$ connected to respective pistons 22$_{1-4}$ by assemblies 30$_{1-4}$. The crankshaft arrangement shown in FIG. 3 is known as a symmetrical crankshaft which is conventional for 4-cylinder, 4-cycle engines.

Assembly 30 includes a first member 32, a second member 33, and third and fourth members 34, 35. Each of the four members 32-35 has two attachment positions. First member 32 is rotatably connected to crankshaft 20 at a third attachment position 48 (in the preferred embodiment, third attachment position 48 is centered between the first and second attachment positions). The four members 32-35 are rotatably connected at the various attachment points so that the third and fourth members 34, 35 are arranged in a crossing relationship, and so that four connections 52, 53, 54, and 55 are established. Specifically, when first member 32 and second member 33 are arranged so that they are parallel, each of the third and fourth members 34, 35 are rotatably connected to respective, opposite ends of the first and second members 32, 33. Second member 33 is attached to piston 22 by a fixed connection or integral with piston 22.

In the preferred embodiment of assembly 30, connection points 54 and 55 define an axis which is substantially perpendicular to the reciprocal axis R. It is possible to eliminate second member 33 and to maintain the desired relationship of the axis defined by connection points 54 and 55 and axis R by providing attachment points on piston 22 so that rotatable connections 54 and 55 are established between respective ones of third and fourth members 34, 35 in piston 22.

The characteristics of the path 56 of the center attachment point 48 of member 32 (which is connected to crank pin 26 and indicated as E for the purposes of the equations set forth below) with respect to member 33, when members 34 and 35 are allowed to rotate about connection points 52-55, is determined by the ratios of the distances between the connection points 52-55. The distances between the connection points 52-55 are as follows: A is the distance between pivot points 52 and 53, B is the distance between pivot points 54 and 55, C is the distance between pivot points 53 and 54, and D is the distance between the pivot points 52 and 55. Three examples of the ratios of A:B:C have been analyzed: 2:4:5; 1.975: 4:5.15; and 3:4:5. In general, the ratio A:B may range from 1.5:4 (0.375) to 3.5:4 (0.875) and the ratio B:C may range from 4:4.5 (0.888) to 4:5.5 (0.727). The ranges of the ratios are intended to provide for engineering and/or fabrication tolerances.

One advantage of a connecting rod assembly in accordance with the present invention is that piston 22 is maintained at a substantially constant distance from crank pin 26, and thus moves in essentially simple harmonic linear motion in response to uniform rotational motion of crankshaft 20. Essentially simple harmonic linear motion of piston 22 reduces engine vibration by eliminating forces and moments other than the primary forces and moments, and increases efficiency by reducing the negative work performed by the engine due to ignition before top dead center (btdc). In particular, for $(r/l)=0$ in equation (1) only a primary unbalanced force remains.

Another advantage of a connecting rod assembly in accordance with the present invention is that the amount of negative work performed by an engine is reduced. As the motion of a piston approaches that of simple harmonic motion, the piston is closer to its top dead center position for a given crankshaft angle $\theta$. In this case, the same amount of ignition advance in time or as measured by crank angle could be used so as not to compromise the optimum conditions of combustion pressure rise and crank angle during the expansion stroke, but with a resulting relative decrease in the amount of negative work done by the engine. Thus, a net increase of positive work is done during each compression-expansion cycle of the engine, therefore increasing engine efficiency.

Figure 10:
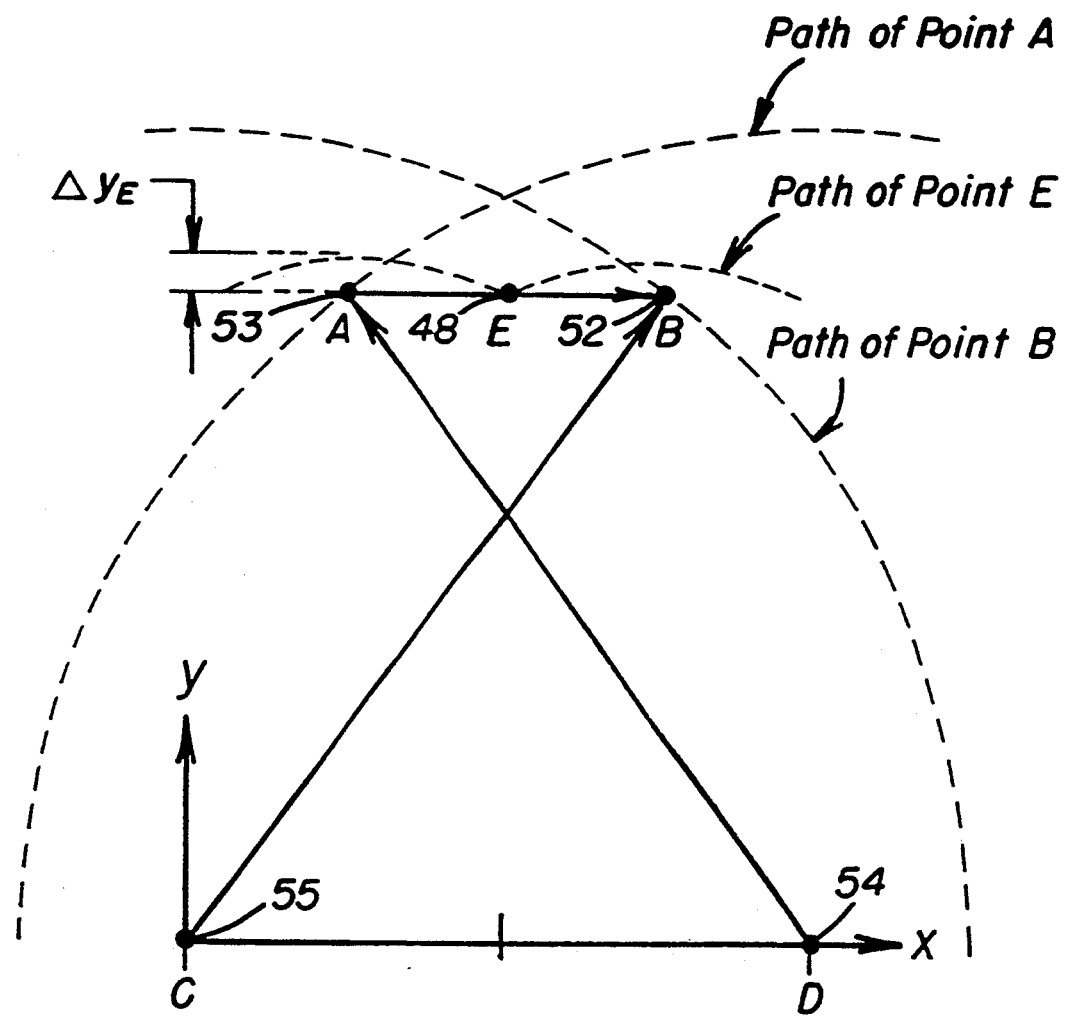
FIG. 10 is a diagram useful in describing the motion of the pivot points of the members of a connecting device in accordance with the present invention.

With reference to FIG. 10, in the case of a symmetrical arrangement, when the distances between pivot points 53 and 54 and the pivot points 52 and 55 are equal, the path of point E is symmetric. Only the symmetrical case (i.e., equal distances between the attachment points of members 34 and 35 and equal distances between pivot points 53 and 54 and the pivot points 52 and 55) is considered herein. If pivot points 54 and 55 have fixed x-positions relative to an x,y coordinate system, pivot points 52 and 53 follow circular paths.

The point E can be determined by solving equations (4) and (5) for $x_E$ (the position of point E along the x axis) and $y_E$ (the position of point E along the y axis) for different plugged-in values of $x_B$ (the position of pivot point 52 along the x axis) between 0 and $(A+B)/2$.

$$\left( x_B - B + \sqrt{C^2 - [2y_E - \sqrt{C^2 - x_B^2}]^2} \right)^2 + \quad (4)$$

$$[2\sqrt{C^2 - x_B^2} - 2y_E]^2 - A^2 = 0$$

$$x_B + B - \sqrt{C^2 - [2y_E - \sqrt{C^2 - x_B^2}]^2} - 2x_E = 0 \quad (5)$$

Equations (4) and (5) give the x-y coordinates of point E along half its symmetrical path from $x=0$ to $x=B/2$. The y coordinates of this path indicates any height change of point E as measured from the x axis. Any change in height of point E is considered a deviation from a linear path. The percentage of this deviation from linearity, relative to the height of point E at the center position $(x=B/2)$, is shown in the graph of FIG. 9 for three different arm ratios: A:B:C (where $C=D$).

The maximum deviation represents the maximum variation in the y-separation distance between the crank pin 26 and the piston 22. Using equation (2), an equivalent ratio $(r/l)_{eq}$ can be defined as the corresponding value of $r/l$ which yields a percent maximum deviation of 0.25%. The equivalent ratio $(r/l)_{eq}$ for the 2:4:5 system is 0.01. Calculation of an equivalent ratio can be made using equation (6):

$$\%\Delta Y_{eq} = \frac{1 - \sqrt{1 - [(r/l)_{eq}]^2}}{2(r/l)_{eq}} \times 100 \quad (6)$$

Figure 11:
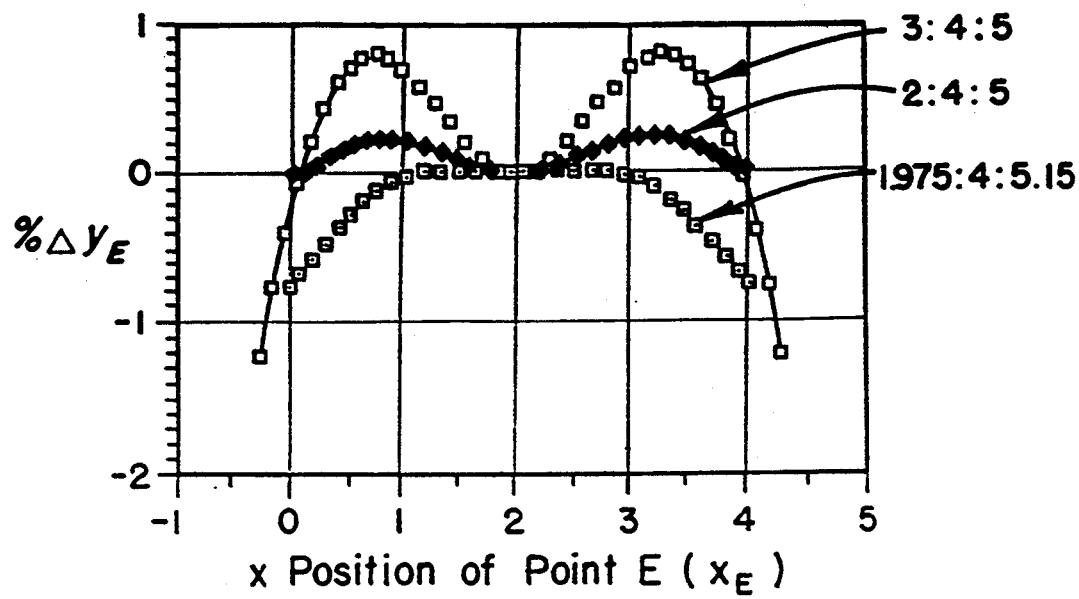
FIG. 11 is a graph useful in showing the essentially constant distance between two objects connected by various embodiments of a connecting device in accordance with the present invention.
Figure 12:
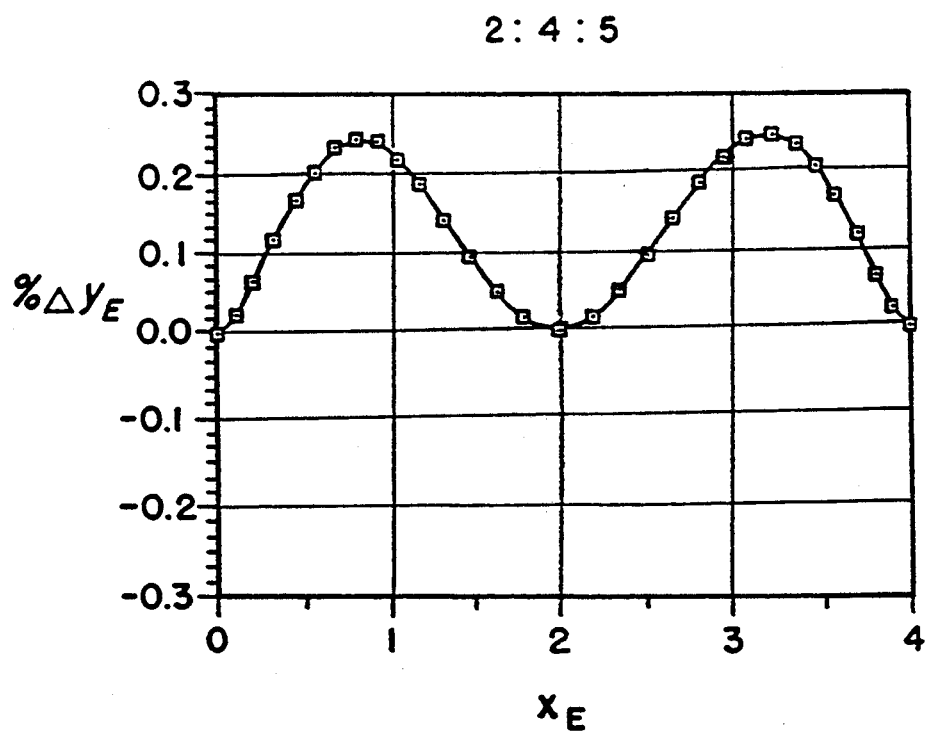
FIG. 12 is a graph useful in showing the essentially constant distance between two objects connected by a connecting device in accordance with the present invention in which the pivot point spacings have the ratio 2:4:5.

The graph of FIG. 12 shows that for arm ratios of 2:4:5, the maximum deviation from linearity $\%\Delta Y_{eq}$ over the whole range of x movement is about 0.25%. Since the range in x is about equal to the average height y, the maximum deviation of y from linearity is less than 0.25% of the total x range of motion. This maximum deviation corresponds to about 0.010" for arms that are of the dimensions: 2", 4" and 5" with a corresponding linear travel of 4". As shown in FIG. 11, for the ratios 1.975:4:5.15, $\%\Delta Y$ is about 0.8% and for the ratios 3:4:5, $\%\Delta Y$ is about 1.3%.

Figure 13A:
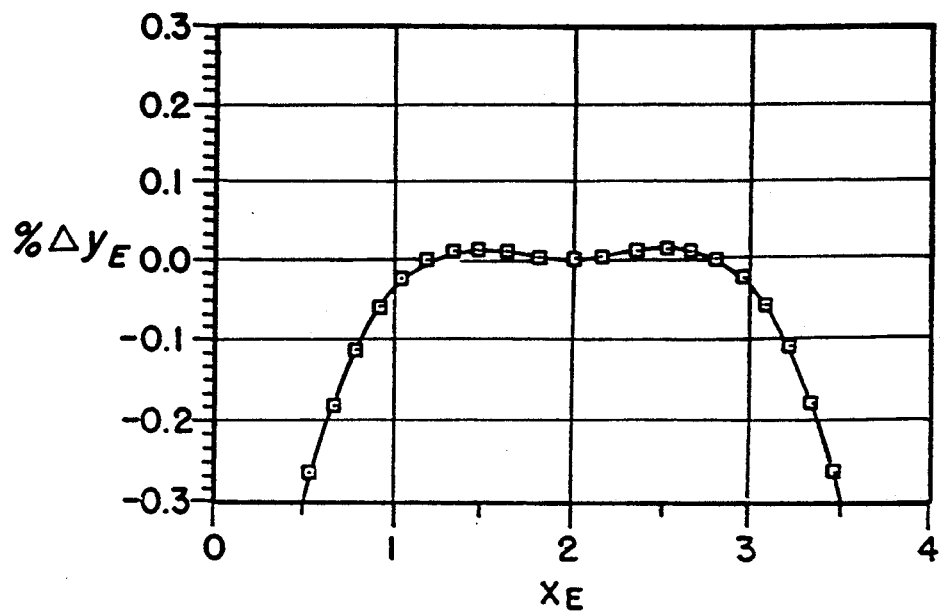
FIGS. 13A and 13B are graphs useful in showing the essentially constant distance between two objects connected by a connecting device in accordance with the present invention in which the pivot point spacings have the ratio 1.975:4:5.15.
Figure 13B:
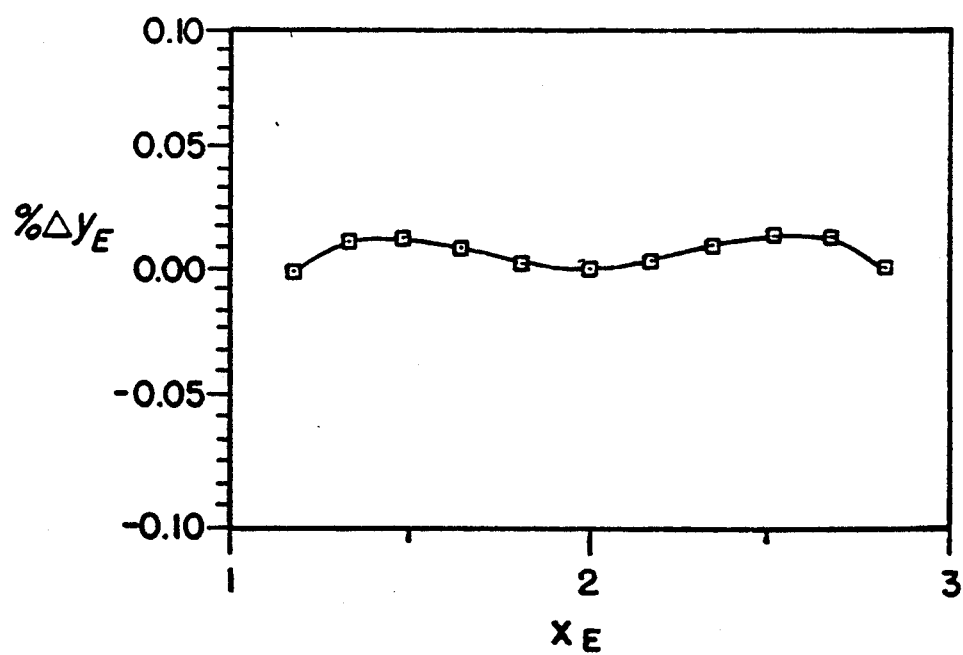

The ratio 1.975:4:5.15 gives a flatter path than the 2:4:5 ratio system for the central part of the path. This is very linear over about half the total range of motion, as shown in the graph of FIG. 13A. A magnification of the y axis in the graph of FIG. 13B reveals a maximum deviation of height of about 0.01% for about half of the total path near the center position of the mechanism.

In the context of the present invention, essentially simple harmonic linear motion of a piston 22 and an essentially fixed y-separation distance between crank pin 26 and a selected point on piston 22 are defined by a system which provides $\%\Delta Y_{eq}$ less than or equal to approximately 2.5%. Alternatively, essentially simple harmonic linear motion is defined as motion which yields a second order component of acceleration for a piston 22 which is less than ten percent (10%) (i.e. $(r/l)_{eq}=0.1$) of the first order component of acceleration for the piston 22. The disclosed ranges of the ratios A:B:C all provide essentially simple harmonic linear motion with the appropriate selection of the range of movement of point E (48) along the x axis. For example, in the case of an internal combustion engine, the movement of point E(48) is controlled by the range of distance r between the crankshaft rotational axis and the crank pin axis.

Figures 5A, 5B, 5C:
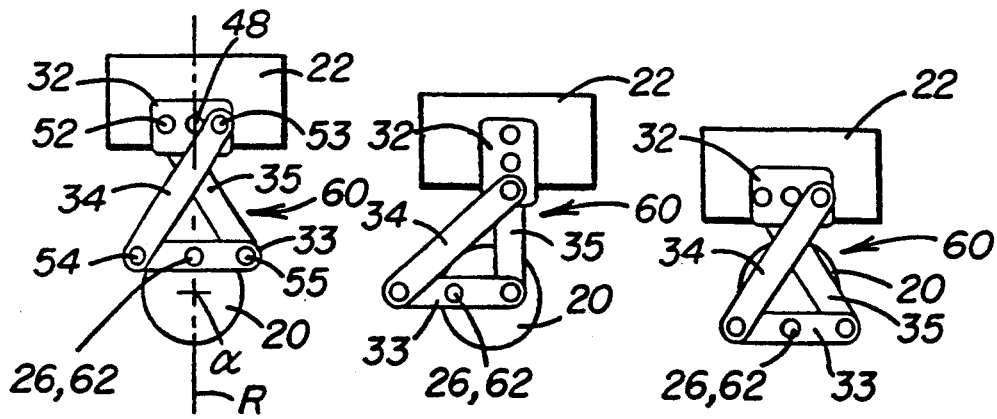
FIGS. 5A-5C show various positions of a crankshaft, piston, connecting rod assembly in accordance with another embodiment of the present invention.

Alternative embodiments of connecting rod assemblies will be described with reference to FIGS. 5-7. FIGS. 5A-5C illustrate a connecting rod assembly 60 which has the same construction as connecting rod assembly 30, but which has different connections to crankshaft 20 and piston 22. In particular, third attachment point 48 of first member 32 is rotatably attached to piston 22, and a third attachment position 62 of second member 33 is rotatably attached to crank pin 26 of crankshaft 20. In the preferred embodiment of connecting rod assembly 60, the axis defined by connection points 54 and 55, i.e., the axis of second member 33, is maintained in a perpendicular relationship with reciprocal axis R.

In the case of assembly 60, the ratios A:B:C are the same as the ratios disclosed for assembly 30.

Figure 6A:
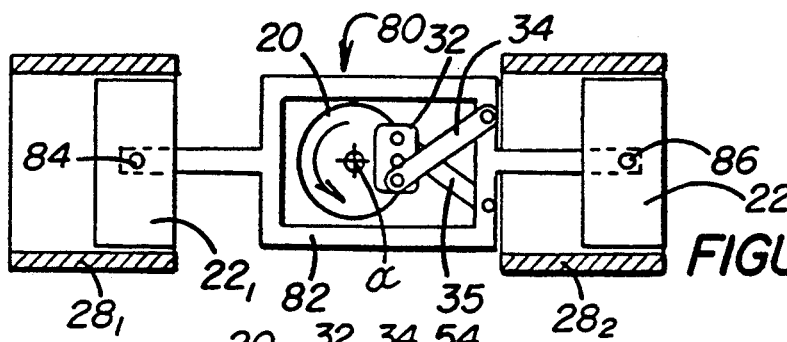
FIGS. 6A-6C show various positions of a crankshaft, piston, and a connecting rod assembly in accordance with the present invention adapted to an engine having horizontally opposed pistons.
Figure 6B:
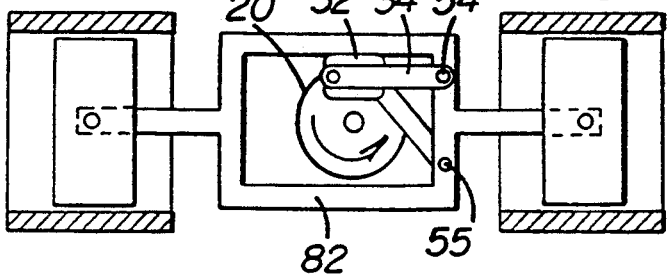
Figure 6C:
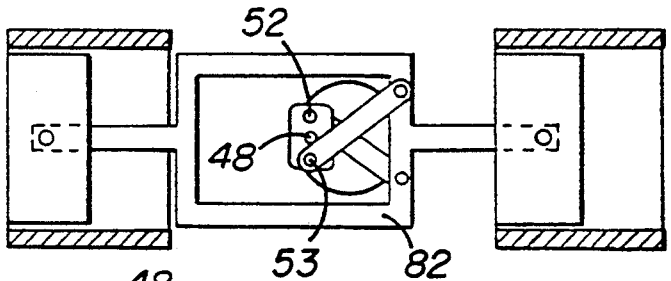

FIGS. 6A-6C illustrate an engine having first and second opposed cylinders $22_1$, $22_2$ which are connected to crankshaft 20 by a connecting rod assembly 80. In connecting rod assembly 80, the first, third and fourth members 32, 34 and 35 and the connections therebetween 52, 53 are the same as those discussed with reference to FIGS. 4A-4C. Second member 82 of assembly 80 is rotatably connected to third and fourth members 34, 35 at pivot points 54 and 55, respectively. Second member 82 is attached to both first and second pistons $22_1$, $22_2$ at respective ones of attachment points 84 and 86 so that the first and second pistons $22_1$, $22_2$ are maintained at a constant distance by a mechanical structure. Thus, first and second pistons $22_1$, $22_2$ have a constant phase difference of 180°, and both move in essentially simple harmonic linear motion in response to uniform rotation of crankshaft 20. Connections 84, 86 may be rotatable or rigid connections. The ratios A:B:C for assembly 80 are the same ratios identified with respect to assembly 30.

Figures 7A, 7B, 7C:
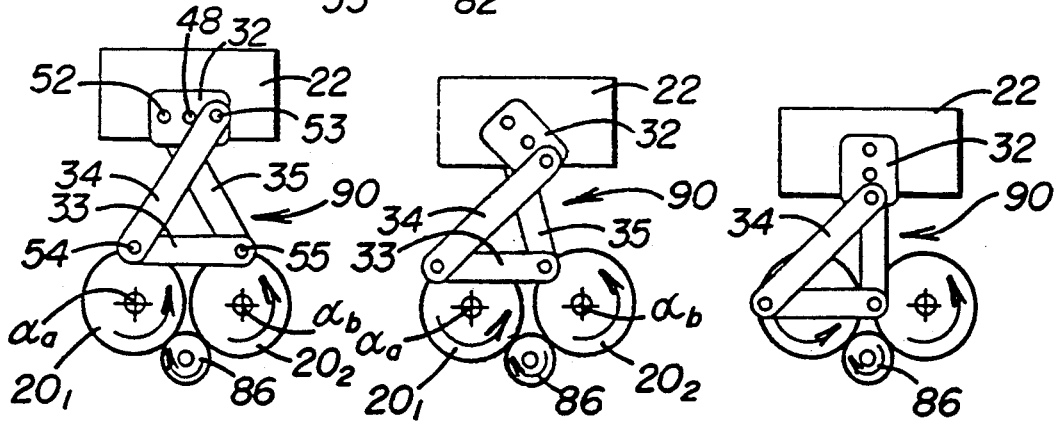
FIGS. 7A-7E show various positions of a crankshaft, piston, and a connecting rod assembly in accordance with the present invention adapted to an engine having dual crankshafts.
Figures 7D, 7E:
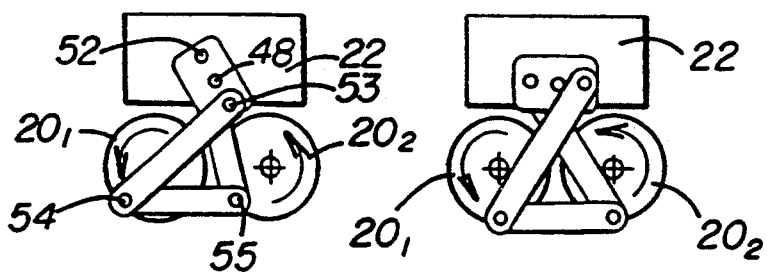

FIGS. 7A-7E show a dual crankshaft engine having crankshafts $20_1$, $20_2$ which rotate uniformly with the same direction of rotation. Uniform rotation can be achieved with a gear 86 (shown only in FIGS. 7A-7C for clarity), or with belts, sprockets and chains, or other linkages between crankshafts $20_1$, $20_2$. In this embodiment, a connecting rod assembly 90 has the same structure as connecting rod assembly 60 (FIGS. 5A-5C). However, the connections of member 33 to first and second crankshafts $20_1$ $20_2$ are different. In particular, the third attachment position 48 of first member 32 is rotatably connected to piston 22, and connection points 54 and 55 correspond to connections of respective ones of third and fourth members, 34, 35 to the first and second crankshafts $20_1$, $20_2$. FIG. 7A illustrates the top dead center $(\theta=0°)$ position and FIG. 7E illustrates the bottom dead center $(\theta=180°)$ position.

As long as other linkages exist between crankshafts $20_1$ $20_2$, second member 33 is an optional member which is not required; however, the axis defined by pivot points 54 and 55 should be substantially parallel to the axis defined by first and second rotational axes $a_1$, $a_2$ of respective ones of crankshafts $20_1$, $20_2$ and perpendicular to the reciprocal axis R. Because dual crankshafts are utilized, axis R does not pass through the rotational axis of either of the crankshafts. The ratios A:B:C for assembly 90 are the same as the ratios identified with respect to assembly 60.

As the motion of the piston approaches that of simple harmonic motion, only the primary forces and moments exist and only the second order inertia torque exists. This would eliminate all the higher harmonic forces, moments and torques that still remain in conventional well-balanced engines. Since in this case only primary forces ad moments need to be balanced, the following configurations of completely balanced engines, which do not require as many cylinders as the as the conventional well-balanced engines listed above, are possible: in-line engines with 4 cylinders; horizontally-opposed engines with 4 or 6 cylinders; "V" type engines with 2, 4, or 6 cylinders (with counter-weighted crank); "V" type engines with 8 cylinders (without counter-weighted crank); "W" type engines with 3, 6, or 12 cylinders; "X" type engines with 4, 8, 12 or 16 cylinders (with counter-weighted crank); and radial engines (without counter-rotating counter-weight).

Two alternative devices using structure similar to the connecting rod assemblies in accordance with the present invention will be described with reference to FIGS. 8 and 9. FIGS. 8A–8D illustrate a "walking device" 100. Walking device 100 is, in general, a pair of assemblies (similar to connecting rod assembly 30) which have a common first member. First member 132 has an attachment point 148 (point E) which is attached to, for example, an axle of the vehicle. In order to provide for the transmission of torque from the axle the first member 132, the axle and first member 132 may be splined, or a multi-bolt connection similar to conventional automobile axles may be utilized. Two second members $133_1$, $133_2$ are the "feet" of the walking device 100. Two third members $134_2$, and two fourth members $135_1$, $135_2$ connect the first member 132 to respective ones of the two second members $133_1$, $133_2$. In particular, connection point 152 rotatably connects first member 132, one third member $134_1$, and one fourth member $135_2$, and connection point 153 rotatably connects first member 132, the other fourth member $135_1$ and the other third member $134_2$. Further, connection point $154_1$ rotatably connects the third member $134_1$ and the second member $133_1$, connection point $155_1$ rotatably connects the second member $133_1$ and the fourth member $135_1$, connection point $154_2$ rotatably connects the second member $133_2$ and the third member $134_2$, and connection point $155_1$ rotatably connects the second member $133_2$ and the fourth member $135_2$.

FIG. 8A shows the walking device 100 in an "upright" position. As rotational force is applied to connection point 148 of first member 132, the walking device 100 begins to fold upon itself, as shown in FIG. 8B. In the orientation shown in FIG. 8B, the second member 133 remains on the surface being walked upon. As the walking device continues to fold upon itself, as shown in FIG. 8C, a transition takes place as second member $133_2$ contacts the surface being walked upon and then second member $133_1$ is lifted off of the surface. FIG. 8D shows the walking device 100 at rotation continues toward the upright position where the second member $133_2$ is on the ground and the second member $133_1$ is parallel to the second member $133_2$.

Walking device 100 provides the advantage of having a large contact area between the walking device and the surface being walked upon, similar to the advantage A caterpillar tread provides with respect to a rolling tire.

The use of a pair of back-to-back assemblies similar to the connecting rod assemblies of the present invention maintains connection point 148 (point E) at a fixed distance $Y_E$ from the surface being walked upon. The percentage $\%\Delta Y_{eq}$ for attachment point 148 depends on the ratios of the length of the various members 132, $133_1$, $134_1$, $134_2$, $135_1$, and $135_2$. The same ratios A:B:C considered for the connecting rod assemblies are useful for the walking device 100.

FIGS. 9A and 9B illustrate four connecting devices $200_1$, $200_2$, $200_3$, and $200_4$ which are attached to a first object 102 and support a second object 204. The principle of operation and the length ratios for each of the first members 232, second members 233, third members 234, and fourth members 235 of the connecting devices 200 are the same as those discussed above with respect to the connecting rod assemblies and the walking device. In the embodiment shown in FIGS. 9A and 9B, objects 202 and 204 are flat objects which are maintained in a parallel relationship at a constant spacing along the y axis during a translation of the second object 204 along the x axis with respect to first object 202.

I claim:

1. An apparatus for translating rotational motion to reciprocal linear motion, comprising:
    first means for moving in rotational motion about a rotational axis;
    second means for moving in reciprocal linear motion along a reciprocal axis, said second means having first and second attachment positions spaced apart by a distance B; and
    third means for connecting said first means and said second means so that said second means moves in essentially simple harmonic linear motion with respect to said rotational axis in response to uniform rotational motion of said first means, said third means comprising:
        a first member rotatably connected to said first means at a first attachment position, said first member having second and third attachment positions spaced apart by a distance A,
        a second member having first and second attachment positions spaced apart by a distance C, said first and second attachment positions of said second member being rotatably connected to respective ones of said second attachment position of said first member and said second attachment position of said second means, and
        a third member having first and second attachment positions spaced apart by a distance substantially equal to the distance C, said first and second attachment positions of said third member being rotatably connected to respective ones of said third attachment position of said first member and said first attachment position of said second means,
    said second and third members being arranged in a crossing relationship,
    the ratio A:B being between 1.5:4 (0.375) and 3.5:4 (0.875) and the ratio B:C being between 4:4.5 (0.888) and 4:5.5 (0.727).

2. An apparatus according to claim 1, wherein:
    said first attachment position of said first member is substantially centered between said second and third attachment positions of said first member; and
    said first and second attachment positions of said second means define a second means axis which is substantially perpendicular to said reciprocal axis.

3. An apparatus according to claim 1, wherein the ratios A:B:C are 2:4:5.

4. An apparatus according to claim 1, wherein the ratios A:B:C are 1.975:4.5.15.

5. An apparatus according to claim 1, wherein the ratios A:B:C are 3:4:5.

6. An apparatus according to claim 1, wherein the essentially simple harmonic linear motion of said second means has first and second order components of acceleration, and said second order component of acceleration is less than five percent (5%) of said first order component.

7. An apparatus according to claim 1, wherein: said first means comprises a crankshaft, said second means comprises a piston, and said third means comprises a connecting rod assembly; and $\%\Delta Y_{eq}$ is less than 2%, where $$\%\Delta Y_{eq} = \frac{1 - \sqrt{1 - [(r/l)_{eq}]^2}}{2(r/l)_{eq}} \times 100.$$

8. An apparatus for translating rotational motion to reciprocal linear motion, comprising:

first means for moving in rotational motion about a rotational axis;

second means for moving in reciprocal linear motion along a reciprocal axis; and third means for connecting said first means and said second means so that said second means moves in essentially simple harmonic linear motion with respect to said rotational axis in response to uniform rotational motion of said first means, said third means comprising:

a first member rotatably connected to said first means at a first attachment position, said first member having second and third attachment positions spaced apart by a distance A, a second member connected to said second means, said second member having first and second attachment positions spaced apart by a distance B, a third member having first and second attachment positions spaced apart by a distance C, said first and second attachment positions of said third member being rotatably connected to respective ones of said second attachment position of said first member and said second attachment position of said second member, and a fourth member having first and second attachment positions spaced apart by a distance substantially equal to the distance C, said first and second attachment positions of said fourth member being rotatably connected to respective ones of said third attachment position of said first member and said first attachment position of said second member, said third and fourth members being arranged in a crossing relationship, the ratio A:B being between 1.5:4 (0.375) and 3.5:4 (0.875) and the ratio B:C being between 4:4.5 (0.888) and 4:5.5 (0.727).

9. An apparatus according to claim 8, wherein said first attachment position of said first member is substantially centered between said second and third attachment positions of said first member.

10. An apparatus according to claim 9, wherein said second member has a second member axis defined by said second and third attachment positions of said second member, and said second member axis is substantially perpendicular to said reciprocal axis.

11. An apparatus according to claim 8, wherein the ratios A:B:C are 2:4:5.

12. An apparatus according to claim 8, wherein the ratios A:B:C are 1.975:4:5.15.

13. An apparatus according to claim 8, wherein the ratios A:B:C are 3:4:5.

14. An apparatus according to claim 8, wherein: said first means comprises a crankshaft, said second means comprises a piston, and said third means comprises a connecting rod assembly; and $\%\Delta Y_{eq}$ is less than 2%, where $$\%\Delta Y_{eq} = \frac{1 - \sqrt{1 - [(r/l)_{eq}]^2}}{2(r/l)_{eq}} \times 100.$$

15. An apparatus for translating rotational motion to reciprocal linear motion, comprising:

first means for moving in rotational motion about a rotational axis;

second means for moving in reciprocal linear motion along a reciprocal axis; and third means for connecting said first means and said second means so that said second means moves in essentially simple harmonic linear motion with respect to said rotational axis in response to uniform rotational motion of said first means, said third means comprising:

a first member rotatably connected to said first means at a first attachment position, said first member having second and third attachment positions spaced apart by a distance A, a second member rotatably connected to said second means at a first attachment position, said second member, having second and third attachment positions spaced apart by a distance B, a third member having first and second attachment positions spaced apart by a distance C, said first and second attachment positions of said third member being rotatably connected to respective ones of said second attachment position of said first member and said third attachment position of said second member, and a fourth member having first and second attachment positions spaced apart by a distance substantially equal to the distance C, said first and second attachment positions of said fourth member being rotatably connected to respective ones of said third attachment position of said first member and said second attachment position of said second member, said third and fourth members are arranged in a crossing relationship, the ratio A:B being between 4:1.5 (2.666) and 4:3.5 (1.142) and the ratio A:C being between 4:4.5 (0.888) and 4:5.5 (0.727).

16. An apparatus according to claim 15, wherein said first attachment position of said second member is substantially centered between said second and third attachment positions of said second member.

17. An apparatus according to claim 16, wherein said first member has a first member axis defined by said second and third attachment positions of said first member, and said first member axis is substantially perpendicular to said reciprocal axis.

18. An apparatus according to claim 15, wherein the ratios A:B:C are 4:1.975:5.15.

19. An apparatus according to claim 15, wherein the ratios A:B:C are 3:4:5.

20. An apparatus according to claim 15, wherein the ratios A:B:C are 4:3:5.

21. An apparatus according to claim 15, wherein: said first means comprises a crankshaft, said second means comprises a piston, and said third means comprises a connecting rod assembly; and %ΔY$_{eq}$ is less than 2% where $$\%\Delta Y_{eq} = \frac{1 - \sqrt{1 - [(r/l)_{eq}]^2}}{2(r/l)_{eq}} \times 100.$$

22. An apparatus for connecting first and second objects, comprising:
   a first object adapted for rotational motion about an rotational axis having a fixed position in an x-y coordinate system, said first object having an attachment position radially spaced from said rotational axis;
   a second object adapted for reciprocal linear motion along the y axis of the x-y coordinate system, said second object having first and second attachment positions spaced apart by a distance B; and
   means for connecting said second object and said attachment position of said first object so that said attachment position and a selected point on said second object are maintained at an essentially fixed y-separation distance throughout a full rotation of said first object, said means for connecting comprising:
      a first member rotatably connected to said first object, said first member having first and second attachment positions spaced apart by a distance A,
      a second member having first and second attachment positions spaced apart by a distance C, said first and second attachment positions of said second member being rotatably connected to respective ones of said first attachment position of said first member and said second attachment position of said second object, and
      a third member having first and second attachment positions spaced apart by a distance substantially equal to the distance C, said first and second attachment positions of said third member being rotatably connected to respective ones of said second attachment position of said first member and said first attachment position of said second object,
   said second and third members being arranged in a crossing relationship,
   the ratio A:B is between 1.5:4 (0.375) and 3.5:4 (0.875),
   said essentially fixed y-separation distance has a variance of less than 0.5%.

23. An apparatus for connecting first and second objects, comprising:
   a first object adapted for rotational motion about an rotational axis having a fixed position in an x-y coordinate system, said first object having an attachment position radially spaced from said rotational axis;
   a second object adapted for reciprocal linear motion along the y axis of the x-y coordinate system, said second object having first and second attachment positions spaced apart by a distance B; and
   means for connecting said second object and said attachment position of said first object so that said attachment position and a selected point on said second object are maintained at an essentially fixed y-separation distance throughout a full rotation of said first object, said means for connecting comprising:
      a first member rotatably connected to said first object, said first member having first and second attachment positions spaced apart by a distance A,
      a second member rotatably connected to said second object, said second member having first and second attachment positions spaced apart by a distance B,
      a third member having first and second attachment positions spaced apart by a distance C, said first and second attachment positions of said third member being rotatably connected to respective ones of said first attachment position of said first member and said second attachment position of said second member, and
      a fourth member having first and second attachment positions spaced apart by a distance substantially equal to the distance C, said first and second attachment positions of said fourth member being rotatably connected to respective ones of said second attachment position of said first member and said first attachment position of said second member,
   said third and fourth members being arranged in a crossing relationship,
   the ratio A:B being between 1.5:4 (0.375) and 3.5:4 (0.875) and the ratio B:C being between 4:4.5 (0.888) and 4:5.5 (0.727),
   said essentially y-separation distance having a variance of less than 0.5%.

24. An apparatus for connecting first and second objects, comprising:
   a first object adapted for rotational motion about an rotational axis having a fixed position in an x-y coordinate system, said first object having an attachment position radially spaced from said rotational axis;
   a second object adapted for reciprocal linear motion along the y axis of the x-y coordinate system, said second object having first and second attachment positions spaced apart by a distance B; and
   means for connecting said second object and said attachment position of said first object so that said attachment position and a selected point on said second object are maintained at an essentially fixed y-separation distance throughout a full rotation of said first object, said means for connecting comprising:
      a first member rotatably connected to said first object, said first member having first and second attachment positions spaced apart by a distance A,
      a second member rotatably connected to said second object, said second member having first and second attachment positions spaced apart by a distance B, a third member having first and second attachment positions spaced apart by a distance C, said first and second attachment positions of said third member being rotatably connected to respective ones of said first attachment position of said first member and said second attachment position of said second member, and a fourth member having first and second attachment positions spaced apart by a distance substantially equal to the third distance, said first and second attachment positions of said fourth member being rotatably connected to respective ones of said second attachment position of said first member and said first attachment position of said second member, said third and fourth members being arranged in crossing relationship, the ratio A:B being between 4:1.5 (2.666) and 4:3.5 (1.152) and the ratio A:C being between 4:4.5 (0.888) and 4:5.5 (0.727), said essentially fixed y-separation distance having a variance of less than 0.5%.

25. An apparatus for translating rotational motion to reciprocal linear motion, comprising:

rotating means;

reciprocating means; and connecting means for connecting the rotating means to the reciprocating means, said connecting means comprising:

a first member rotatably connected to said rotating means at a first connection, and second and third members rotatably connected to said first member at respective second and third connections offset from said first connection and offset from each other by a distance A, and rotatably connected to said reciprocating means at respective fourth and fifth connections offset from each other by a distance B, said second and fourth connections being offset from each other by a distance C, said third and fifth connections being offset from each other by a distance approximately equal to the distance C, the ratio A:B being between 1.5:4 (0.375) and 3.5:4 (0.875), the ratio B:C being between 4:4.5 (0.888) and 4:5.5 (0.727), said second and third members being arranged in a crossing relationship.

26. An apparatus according to claim 25, wherein said connecting means maintains said first connection and an axis defined by said fourth and fifth connections at an essentially fixed distance.

27. An apparatus according to claim 25, wherein:

said rotating means rotates about a rotational axis; and said connecting means connects said rotating means and said reciprocating means so that said reciprocating means moves in essentially simple harmonic linear motion with respect to said rotational axis in response to uniform rotational motion of said rotating means.

28. An apparatus according to claim 25, wherein said first connection is substantially centered between said second and third connections.

29. An apparatus according to claim 28, wherein:

said reciprocal means moves along a reciprocal axis; and said fourth and fifth connections define an axis which is substantially perpendicular to said reciprocal axis.

30. A connecting assembly, comprising:

a first member, having respective first and second attachment positions spaced apart by a distance A;

a second member having first and second attachment positions spaced apart by a distance C, said first attachment position of said second member being rotatably connected to said first attachment position of said first member;

a third member having first and second attachment positions spaced apart by a distance substantially equal to the distance C, said first attachment position of said third member being rotatably connected to said second attachment position of said first member, the distance A being less than distance C, said second and third members being arranged in a crossing relationship, the ratio A:B being between 1.5:4 and 3.5:4 and the ratio B:C being between 4:4.5 and 4:5.5.

31. A connecting assembly according to claim 30, further comprising a fourth member having first and second attachment positions spaced apart by a distance B, wherein:

said second attachment position of said second member is rotatably connected to said first attachment position of said fourth member; and said second attachment position of said third member is rotatably connected to said second attachment position of said fourth member and the distance A is less than the distance B, and the distance B is less than the distance C.

32. A connecting assembly according to claim 31, wherein said fourth member comprises a piston for an internal combustion engine.

* * * * *